United States Patent [19]

Tsujido

[11] Patent Number: 4,994,977
[45] Date of Patent: Feb. 19, 1991

[54] METHOD OF DETECTING AN INTERFERENCE IN THE CONTROL OF A PLURALITY OF MECHANICAL SYSTEMS

[75] Inventor: Yoshinori Tsujido, Hyogo, Japan

[73] Assignee: Mitsubishi Denki Kabushiki Kaisha, Tokyo, Japan

[21] Appl. No.: 309,574

[22] Filed: Feb. 13, 1989

[30] Foreign Application Priority Data

Feb. 12, 1988 [JP] Japan .................................. 63-28801

[51] Int. Cl.$^5$ ........................ G06F 15/46; G05B 23/02
[52] U.S. Cl. .............................. 364/474.2; 364/474.22; 364/474.26
[58] Field of Search ........... 364/474.2, 474.19, 474.22, 364/474.26, 578; 318/563, 565, 568.1

[56] References Cited

U.S. PATENT DOCUMENTS

| | | | |
|---|---|---|---|
| 4,633,409 | 12/1986 | Sekikawa | 364/474.2 |
| 4,639,855 | 1/1987 | Sekikawa | 364/188 |
| 4,758,961 | 7/1988 | Uemura | 364/474.2 |
| 4,764,873 | 8/1988 | Libby | 364/474.2 |
| 4,821,201 | 4/1989 | Kawamura et al. | 364/474.2 |

FOREIGN PATENT DOCUMENTS

| | | | |
|---|---|---|---|
| 0057405 | 4/1985 | Japan | 364/474.2 |
| 0217311 | 9/1987 | Japan | 364/474.2 |
| 0029807 | 2/1988 | Japan | 364/474.2 |
| 2117929 | 10/1983 | United Kingdom | 364/474.2 |

Primary Examiner—Joseph Ruggiero
Attorney, Agent, or Firm—Sughrue, Mion, Zinn, Macpeak & Seas

[57] ABSTRACT

A method of detecting an interference in an apparatus such as a machining tool or robot which performs the asynchronous control of a plurality of mechanical systems. According to the detecting method, the highest degree of risk in a predetermined period of time and the highest risk position corresponding to the highest degree of risk can be detected so that figures are displayed as a motion simulation in such a manner that the mutual positions of the systems are moved with the advancement of the simulation while the highest degree of risk occurring in the predetermined period of time. As a result, the control of the mechanical systems can be achieved with high accuracy and ease.

2 Claims, 4 Drawing Sheets

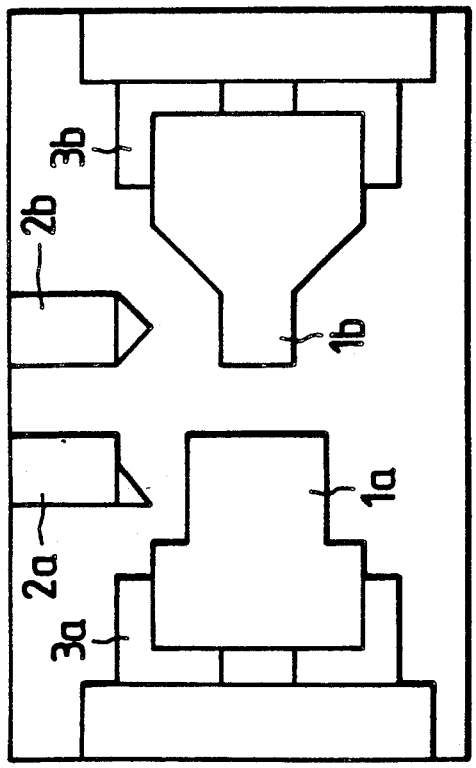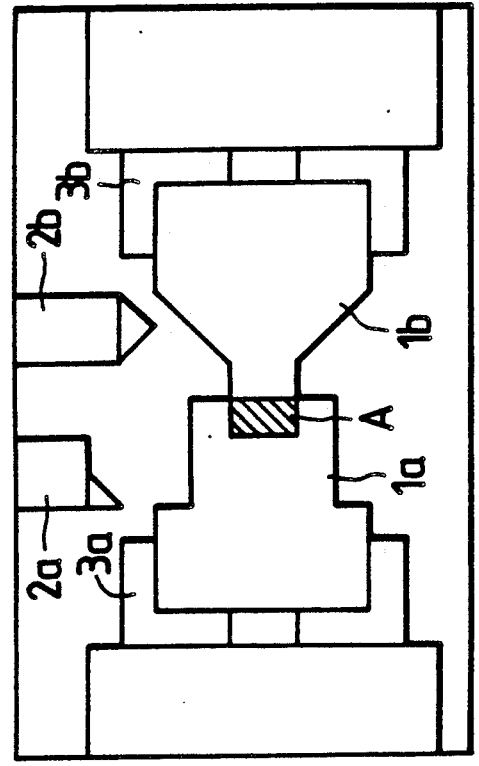

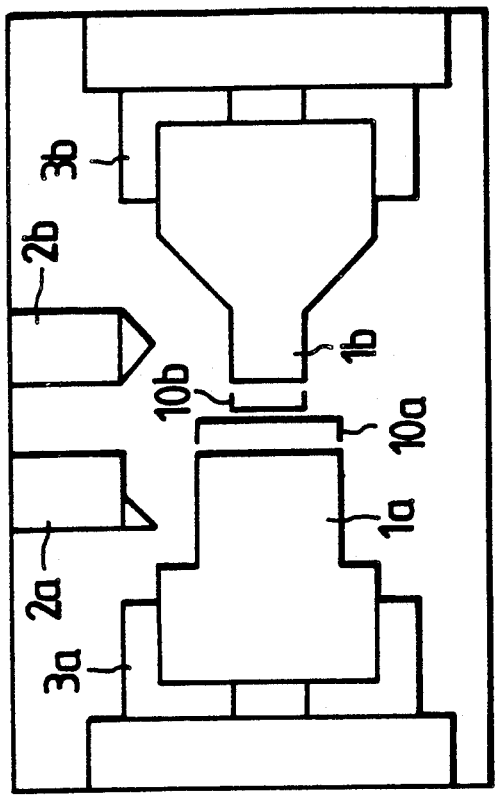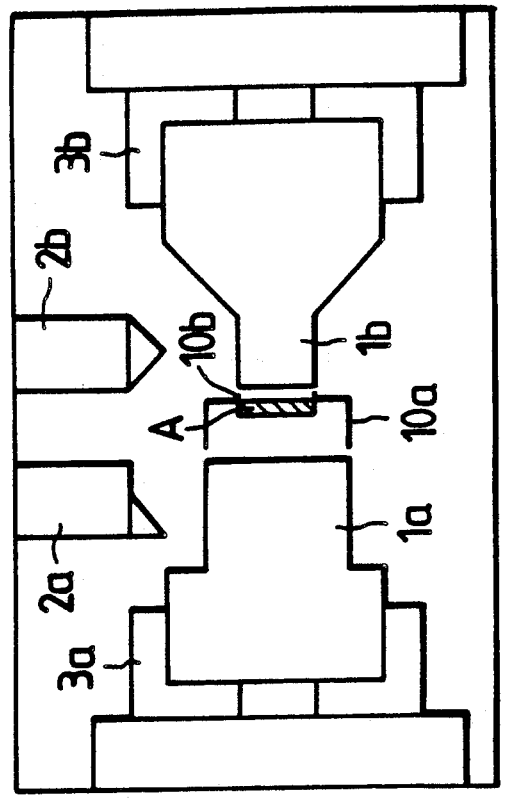
FIG. 3
FIG. 4

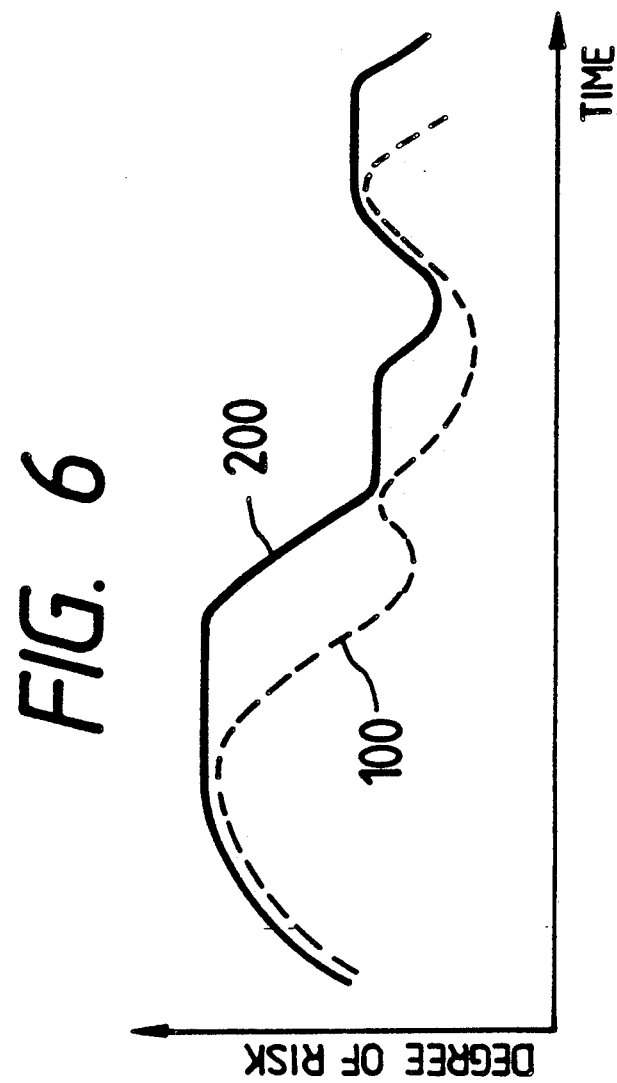

METHOD OF DETECTING AN INTERFERENCE IN THE CONTROL OF A PLURALITY OF MECHANICAL SYSTEMS

BACKGROUND OF THE INVENTION

This invention relates to a method of detecting an interference in an apparatus such as a machining tool or robot which performs the asynchronous control of a plurality of mechanical systems.

FIGS. 1 and 2 are explanatory diagrams for a description of an interference simulation in a multiple spindle lathe having two machining systems. More specifically, FIG. 1 shows the case where it is determined through interference simulation that no interference occurs, and FIG. 2 shows the case where it is determined through interference simulation that an interference may occur. In FIGS. 1 and 2, reference characters $1a$ and $1b$ designate workpieces in first and second mechanical systems, respectively; $2a$ and $2b$, tools (cutting tools) of the first and second mechanical systems, respectively; and $3a$ and $3b$, the chucks of the first and second mechanical systems, respectively.

As was described above, FIGS. 1 and 2 shows the results of simulation of the control operations of the conventional multiple spindle lathe; that is, the positions of the workpieces, tools, and chucks of the two mechanical systems at a certain time instant As the simulation of the control operation advances, these figures are dynamically (or in a motion simulation mode) moved, so that their positions changing with time are simulated. When their figures are as indicated in FIG. 6 during the simulation, the operator can detect that the workpiece $1a$ of the first mechanical system and the workpiece $1b$ of the second mechanical system interfere mechanically with each other as indicated at A in FIG. 2. That is, it is necessary to amend the machining program. Therefore, in response to the indication of the interference of the workpieces, the operator corrects the machining program, and after confirming through simulation that no interference is caused, he starts the actual machining operation. Thus, the interference of workpieces can be avoided in the actual machining operation.

As is apparent from the above description, the conventional simulation is based on the complete reproduction of the actual machining operation. However, in a computerized numerical control lathe or the like, generally its plurality of mechanical systems are controlled in an asynchronous manner. Because of the automatic control of the machining speed in the actual machining operation (the feed speed being automatically controlled on the machining load), there occur errors between the simulation and the actual machining operation; that is, it is impossible to completely simulate the machining operation.

SUMMARY OF THE INVENTION

Accordingly, an object of this invention is to eliminate the above-described difficulty. More specifically, an object of the invention is to provide a method of detecting the interference of workpieces with high reliability regardless of the above-described simulation errors.

In a method of detecting the interference of a plurality of mechanical systems, according to the invention, the asynchronous control of the plural mechanical systems is simulated, for each of the plural mechanical systems, mutual positions thereof with respect to the others, and degrees of risk obtained from the mutual positions or the like are calculated, according to allowable time errors or the like provided for the plurality of mechanical systems, the highest degree of risk occurring in a predetermined period of time, and the highest risk positions corresponding to the highest degree of risk are detected, and the mutual positions thus calculated and the highest risk positions are displayed separately or jointly according to the plurality of mechanical systems in such a manner that the mutual positions are in a motion simulation mode and the highest risk positions are in correspondence to the highest degree of risk in the predetermined period of time.

BRIEF DESCRIPTION OF THE DRAWINGS

In the accompanying drawings:

FIGS. 1 and 2 are diagrams for a description of an interference simulation in a multiple spindle lather having two machining systems;

FIGS. 3 and 4 are diagrams for a description of an interference simulation in one embodiment of this invention;

FIG. 6 is a graphical representation indicating degrees of risk with the lapse of time in the invention.

DESCRIPTION OF THE PREFERRED EMBODIMENT

Figure 5:
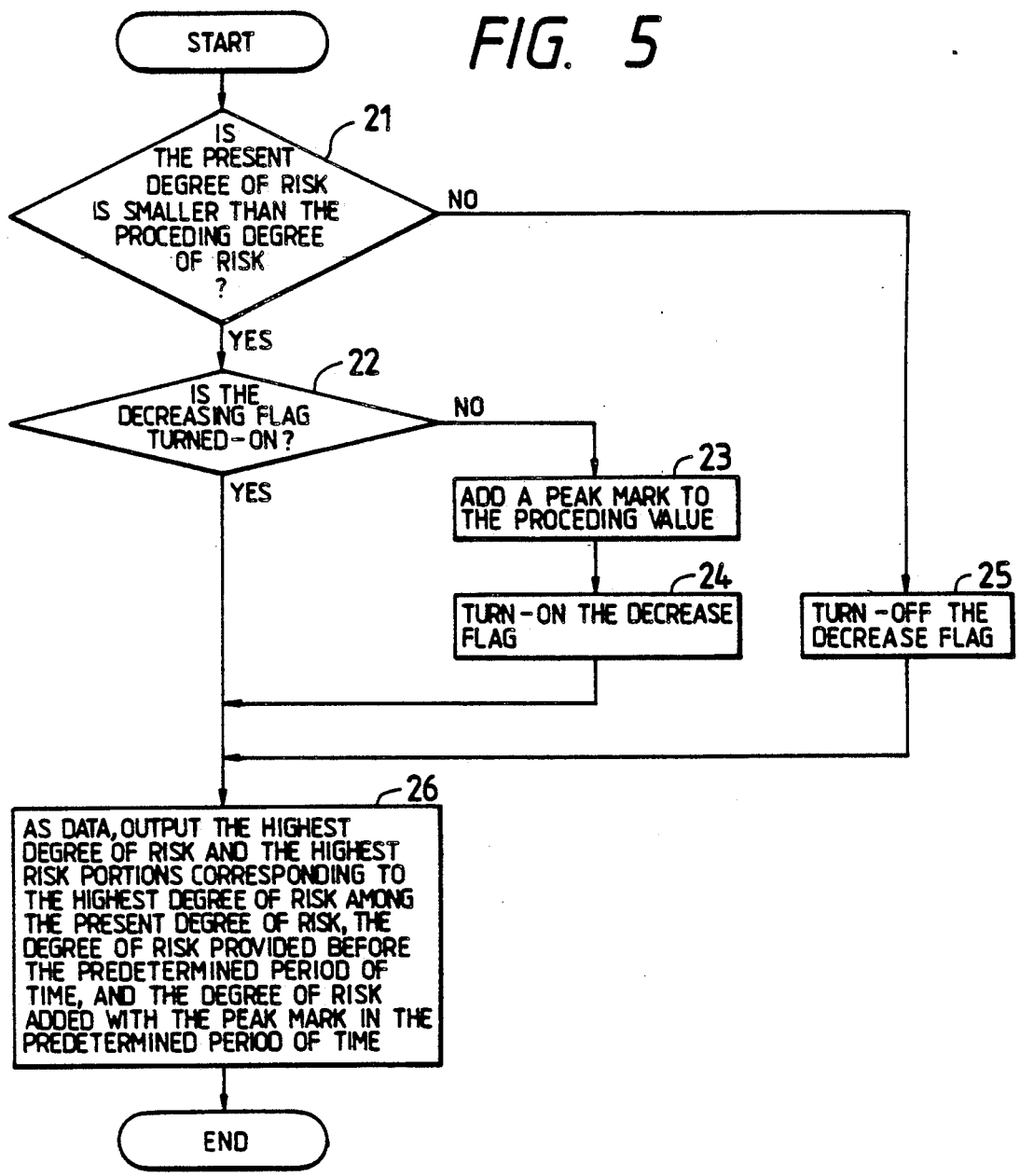
FIG. 5 is a flow chart for detection of the highest degree of risk occurring in a predetermined period of time, and the highest risk positions corresponding to the highest degree of risk in the invention.

FIGS. 3 and 4 are diagrams for a description of an interference simulation in one embodiment of this invention. More specifically, FIG. 3 shows the case where it is determined through interference simulation that no interference is caused, and FIG. 4 shows the case where it is determined through interference simulation that an interference may be caused. In these figures, reference characters $1a$ and $1b$ designate workpieces in first and second mechanical systems respectively; $2a$ and $2b$, tools (or cutting tools) of the first and second mechanical systems, respectively; and $10a$ and $10b$, the positions highest in the degree of risk (hereinafter referred to as "the highest risk positions" when applicable) where the workpieces $1a$ and $1b$ are located in a predetermined period of time from the time instant of an simulation.

FIG. 5 is a flow chart for a description of the detection of the highest degree of risk and the highest risk positions in a predetermined period of time according to the invention.

FIG. 4 is a graphical representation indicating one example of the variation in the degree of risk with time according to the invention.

In FIG. 3, the interference of two workpieces on a multiple spindle lathe having two mechanical systems is simulated, and the result of the simulation is indicated on a graphical display unit. In this case, the degree of risk is increased as the workpieces approach each other; that is, the workpiece $1a$ of the first mechanical system (on the left-handled side in FIG. 1) moves towards the right, or the workpiece $1b$ of the second mechanical system (on the right-handed side of FIG. 1) moves towards the left. Therefore, the data on the mutual positions of the workpieces $1a$ and $1b$ of the first and second mechanical systems can be utilized as a degree of risk. In the case of FIG. 3, the distance between the two workpieces 1a and 1b at the time instant of a simulation, and the distance between the locations highest in the degree of risk where they are located in a predetermined period of time from the time instant of the simulation; i.e., the distance between the two highest risk positions are both so large that no interference will be caused between the workpieces 1a and 1b.

In the case of FIG. 4, at the time instant of a simulation, no interference is caused between the two workpieces 1a and 1b of the first and second mechanical systems; however, the workpieces 1a and 1b are located as indicated at 10a and 10b in a predetermined period of time from the simulation; that is, the highest risk positions 10a and 10b interfere with each other as shown at A. That is, it is determined that, if the first and second mechanical systems make a certain error in control, the two workpieces may be caused to mechanically interfer with each other. The determination of the degree of risk and the risk positions of the workpieces is carried out in each of the steps of simulation of the given control program. That is, for each of the mechanical systems, its mutual position with respect to the other mechanical system is simulated, and the mutual position thus determined or the like is utilized to determine the degree of risk and the risk positions in each step. Among the degrees of risk and the risk positions thus determined, the highest risk positions in the predetermined period of time are selected as follows:

The flow chart of FIG. 5 shows a method of detecting the highest degree of risk and the highest risk positions in the predetermined period of time.

As shown in FIG. 5, in step 21, it is determined whether or not the present degree of risk is smaller than the preceding degree of risk. If not, Step 25 is effected so that a decrease flag is turned off. When it is determined that the present degree of risk is smaller, Step 22 is effected. In Step 22, it is determined whether the decrease flag is turned on or off. If the decrease flag is off, then it is determined that the degree of risk is of the pattern that it is maintained unchanged and begins to decrease, and Step 23 is then effected In Step 23, a peak mark is added to the preceding value indicating the preceding position data Thereafter, Step 24 is effected. In Step 24, the decrease flag is turned on. Then, Step 26 is carried out. If, in Step 22, the decrease flag is on, then it is determined that the degree of risk is being decreased continuously, and Step 26 is effected. In Step 26, among the present degree of risk, the degree of risk provided before the predetermined period of time, and the degree of risk added with the peak mark in the predetermined period of time, the highest degree of risk and the highest risk positions corresponding to the highest degree of risk are outputted as data.

As was described above, FIG. 6 indicates the variation in the degree of risk with the lapse of time. In FIG. 6, the broken line 100 indicates mutual positions through simulation as degrees of risk, and the solid line 200 indicates highest degrees of risk in predetermined periods of time. As is apparent from FIG. 6, in the case where the highest degree of risk (200) indicated by the solid line increases, it increases, without delay, with the degree of risk (100) indicated by the broken line; however, when the degree of risk (100) starts decreasing after reaching the first peak value, the highest degree of risk (200) will not immediately decrease; that is, it is maintained at the peak value for a certain period of time. The data of the highest risk positions calculated from that highest degree of risk, being applied to the mechanical systems, are displayed on the display unit as indicated at 10a and 10b in FIGS. 3 and 4. The figures indicating the mutual positions of the plurality of mechanical systems, for instance the workpiece positions 1a and 1b of FIGS. 3 and 4 are moved, as in a motion picture, on the display unit as the control program simulation advances On the other hand, the figures indicating the highest risk positions in a predetermined period of time, for instance the FIGS. 10a and 10b in FIGS. 1 and 2 are displayed without delay when they are moved to increase the degree of risk, as was described above; whereas when they are moved to decrease the degree of risk, they are displayed with a certain delay time; that is, they are displayed in such a manner that they are maintained held for a certain period of time on the display unit.

Thus, the present mutual positions obtained through simulation, and the highest risk position in the predetermined period of time can be checked with reference to each other. Since the predetermined period of time can be set to an optional value, the time interval in which the highest degree of risk is held can be suitably changed for the checking operation.

The period of time for which the highest degree of risk (200) is maintained unchanged in FIG. 6 correspond to the period of time in which the workpiece positions 10a and 10b highest in the degree of risk are fixedly displayed in FIG. 3 or 4.

In FIG. 3 or 4, only parts of the workpieces 1a and 1b are displayed for indication of the workpiece positions 10a and 10b; however, it should be noted that the invention is not limited to or by the method. For instance, in the case where a color display unit is employed, the workpieces may be displayed in their entirety by making the colors of them different from those of the other components. In order to facilitate the detection of the interference of the workpieces, the interference parts of them may be made different in color from the other parts. This is effective in the visual detection of the interference of the workpieces.

In addition, means may be provided in which hardware automatically detects the occurrence of an interference of workpieces according, for instance, to a method of detecting the overlap of figures on the display unit, so that, when the interference is detected during simulation, an alarm signal is produced to inform the operator of it.

In the case when the interference of workpieces is detected, it is necessary to amend the program. In order to meet this requirement, a system effective in operation and high in efficiency can be formed in which, when the interference is automatically detected as was described above, it automatically makes a request to amend the program, and to correct part of the program.

While the invention has been described with reference to the lathe controlling two mechanical systems, the technical concept of the invention can be equally applied to a lathe controlling more than two mechanical systems. In the latter case, for each of the mechanical systems its mutual positions with respect to the others, the degrees of risk determined from the mutual positions or the like are calculated, and according to the allowable time errors provided for the mechanical systems, the highest degree of risk in the predetermined period of time and the highest risk positions corresponding to the highest degree of risk are determined individually or correlatively, so that the mutual positions and the highest risk positions of the mechanical systems are displayed separately or jointly according to the mechanical systems. Furthermore, the invention is applicable to the detection of interferences in a multiple system control which performs not only a two-dimensional figure display, multi-dimensional figure display and color display but also an acoustic output control and program change control.

As was described above, in the method of the invention, with the asynchronous control conditions of a plurality of mechanical systems simulated, for each of the mechanical system its mutual positions with respect to the others, and the degrees of risk determined from the mutual positions or the like are calculated, and according to the allowable time errors provided for the mechanical systems, the highest degree of risk in the predetermined period of time and the highest risk positions corresponding to the highest degree of risk are detected, so that the figures are displayed in such a manner that the mutual positions are moved, as in a motion picture, with the advancement of the simulation while the highest risk positions are held in correspondence to the highest degree of risk occurring in the predetermined period of time. Therefore, the interference of the workpieces can be readily detected by referring to the two figure positions; that is, the mutual positions of the mechanical systems by the current simulation and the highest risk positions in the predetermined period of time therefrom.

The display of the two figure positions can be made separately or jointly according to the plurality of mechanical systems. Therefore, the control of the mechanical systems can be achieved with ease.

The above-described highest risk positions are determined from the errors attributing to the asynchronous control of a plurality of mechanical systems; that is, they are determined through the simulation severest in condition. Therefore, the use of the positions will result in the detection of the interference of workpieces with high reliability.

As was described before, the period of time predetermined for detection of the highest risk positions can be changed. Therefore, by selecting a suitable value for the period of time thus preset, it can be readily detected when the highest degree of risk occurs in the control operation.

What is claimed is:

1. A method of detecting the interference of a plurality of mechanical systems by simulating a general asynchronous control of said mechanical systems in a motion simulation mode, wherein a plurality of workpieces may be moving independently of each other and a plurality of work tools may be moving independently of each other, said method comprising the steps of:

for each individual one of said mechanical systems within said plurality, calculating the mutual positions of said individual one of said mechanical systems with respect to the other of said mechanical systems within said plurality and calculating the degrees of risk obtained from the proximity of said mutual positions to one another;

detecting a highest degree of risk occurring in a predetermined period of time which is determined according to a possible time error between an actual machining operation and a simulation and identifying the highest risk positions corresponding to said highest risk; and displaying said mutual positions thus calculated and said highest risk positions, in said motion simulation mode, said mutual position of each said mechanical system being displayed separately or jointly prior to the actual machining process.

2. A method of detecting the interference of a plurality of mechanical systems according to claim 1, wherein said highest degree of risk is determined by a method comprising the following steps:

determining a peak position of said degree of risk during said predetermined time period;

comparing said degree of risk associated with a present point in time, said degree of risk associated with a previous point in time, said previous point in time being determined in accordance with said predetermined time period, and said peak position degree of risk; and outputting the highest of the degrees of risk compared in said comparison step as said highest degree of risk.

* * * * *